Figure 1:
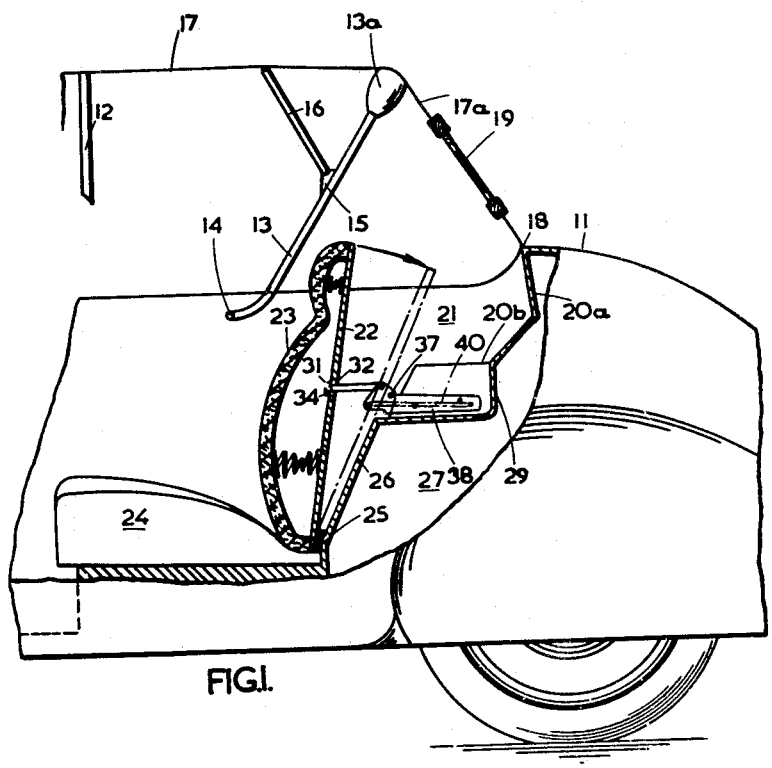

June 12, 1956 — J. H. ORR — 2,750,227
STOWING A DROP-HEAD OF A MOTOR CAR BODY
Filed Aug. 6, 1953 — 2 Sheets-Sheet 1

Inventor
J. H. ORR
by
Mawhinney & Mawhinney
Attys.

June 12, 1956  J. H. ORR  2,750,227
STOWING A DROP-HEAD OF A MOTOR CAR BODY
Filed Aug. 6, 1953  2 Sheets-Sheet 2

Inventor
J. H. ORR
by Mawhinney & Mawhinney
Attys.

United States Patent Office 2,750,227
Patented June 12, 1956

2,750,227

STOWING A DROP-HEAD OF A MOTOR CAR BODY

John Hewitt Orr, Coventry, England, assignor to Carbodies Limited, Coventry, England Application August 6, 1953, Serial No. 372,660

3 Claims. (Cl. 296—65)

The invention relates to a motor car body of the kind having a drop-head and a compartment into which latter at least the top of the drop-head can be retracted for stowing, the front wall of the compartment being provided by a seat-back which is hinged at, or near, its bottom from the body so as to be tiltable forwardly against a bias to widen the mouth of the compartment whereby to facilitate the passing through it of the appropriate portion of the drop-head.

With such an arrangement as hitherto constructed, the operation of stowing the drop-head has required the services of two persons, one to hold the seat-back in its forwardly-tilted position while the other actually stows the drop-head—this being due to the liability of the head fabric to foul the corners of the seat-back. Although two persons are really required for the stowing operation the latter could, of course, be performed by one person but in that case the difficulty would be magnified and an additional manual effort be imposed on the operator.

The main object of the invention is to enable the appropriate portion of the drop-head to be stowed by one person into the compartment with considerably less effort and trouble than with the above-mentioned previous arrangement.

According to the invention, the seat-back is connected with the body by means which sustains the seat-back in its forwardly-tilted position but which allows the seat-back, when a rearward pressure is applied to it (e. g., by a deliberate push, or the pressure of the back of a seated passenger), to return to its normal position.

The sustaining means can be a foldable linkage, connected to the seat-back remotely from its hinge, which becomes unfolded to an overset condition in which it is biased for sustaining the seat-back forwardly tilted, and which has a laterally off-set portion positioned to be acted upon, when the rearward pressure is applied to the seat-back, for "un-oversetting" the linkage against the bias whereby to enable the seat-back to resume its normal position. According to a further feature of the invention it is the bias against which the seat-back can be forwardly tilted which also holds the linkage in the overset condition.

In the case where an arrangement of the kind set forth has the seat-back abutted, to be tilted forwardly, by a power-operated means which is set in operation when a control, for setting in operation a power-operated means for erecting or lowering the head, is actuated, it is arranged, according to a still further feature of the present invention, for the first-mentioned power-operated means to tilt the seat-back forwardly to an extent which is just less than that at which the sustaining means becomes operative whereby, if the said first-mentioned power-operated means should become inoperative (e. g., due to a failure in the power supply), the seat-back can be moved manually forward for the sustaining means to operate.

Figure 2:
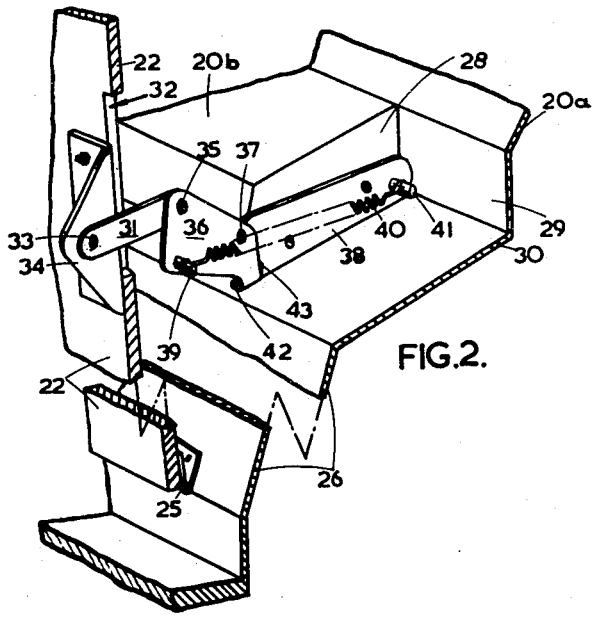
Figure 3:
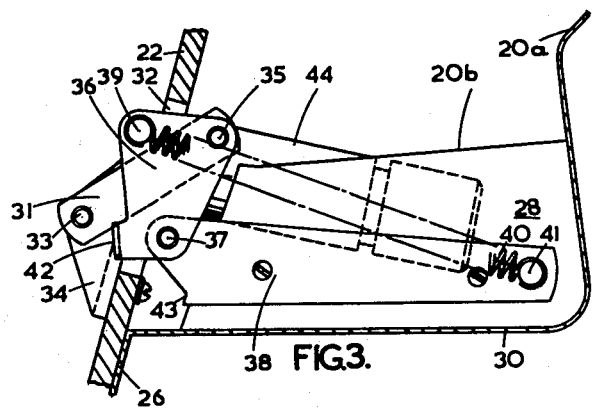
Figure 4:
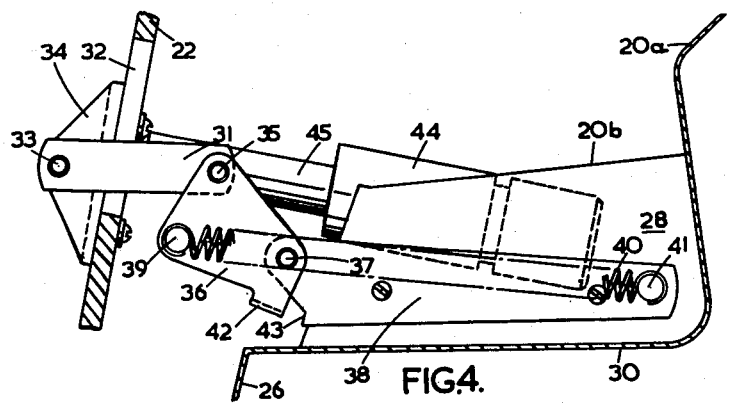
Figure 5:
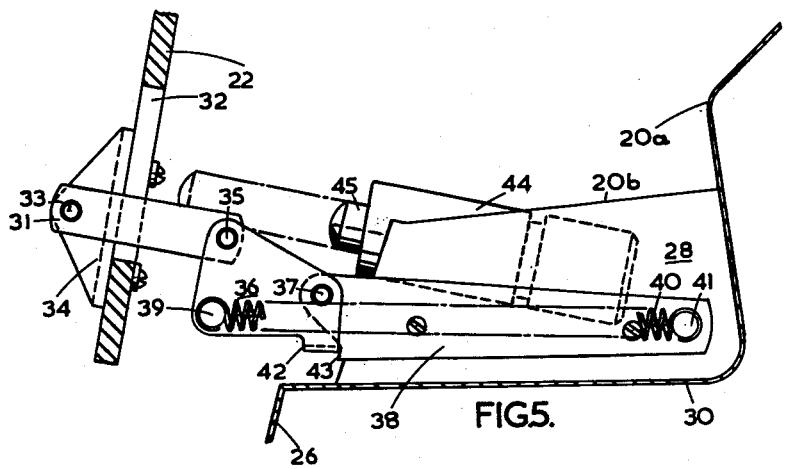

In the accompanying drawings:

Figure 1 is a side elevation of a portion of a motor car body illustrating one embodiment of the sustaining means, a part of the side of the body being broken away and the seat-back being shown in section to facilitate description;

Figure 2 is an enlarged isometric view of the sustaining means of Figure 1 showing the seat-back being urged back to its normal position; and Figures 3, 4 and 5 are side elevations, partly in section and to a larger scale than Figure 2, of the sustaining means of Figure 1 applied to a motor car body provided with a hydraulic means for tilting the seat-back; Figure 3 showing the latter in its normal position; Figure 4 showing its position of tilt when the ram is fully extended; and Figure 5 showing how the seat-back can be tilted farther forward to be held by the sustaining means when the ram is not operating.

Referring to Figures 1 and 2, the motor car body 11 is equipped with a drop-head which includes inverted U-shaped frame members 12 (shown broken away) and 13 pivotally supported from the body. Remotely from its pivot 14 the member 13 has pivoted to it at 15 a subsidiary frame member 16, and all three frame members support a fabric head covering 17 which is made fast at 18 to the back of the body. As shown, the frame member has a widened top portion 13a for avoiding a sharp bend in the fabric where it declines, as a rear panel 17a with a rear light 19, to the fixing position 18.

The body, forwardly of the fixing position 18, is provided with structure 20a, 20b which, together with side portions of the body, form the back, floor and lateral sides of a compartment 21 for receiving the drop-head when lowered, and the front wall of the compartment is provided by the rigid foundation 22 of an upholstered seat-back 23 of which latter the seat portion is shown at 24. The foundation is hinged, at the bottom at 25, to other internal structure 26 against which it rests when in its normal position (indicated by the chain lines in Figure 1) and which can be continuous with the structure 20 and form a wall of a luggage space 27.

At each lateral side of the compartment 21 its floor 20b is fore-shortened for providing recesses which are open at the top and front and are elsewhere bounded by walls 28, 29, 30 and the adjacent side (not shown) of the body as illustrated by Figure 2. Each of these recesses accommodates one of the sustaining means of the invention.

In the construction shown, each of the sustaining means is a foldable linkage including a link 31 which extends through a slot 32 in the foundation 22 and is pivotally connected at the front, at 33, to a bracket 34 within the seat-back and remotely from the hinge 25 of the latter. At the rear end the link is pivoted at 35 to a plate 36 which, in turn, is pivoted at 37, on a parallel axis, to a bracket 38 fast with the wall 28 of the appropriate end recess of the compartment 21. The plate 36, at one side of a notional line joining its two pivotal connections 35 and 37, has an anchorage 39 for one end of a tension spring 40 of which the other end is fast with an anchorage 41 on the bracket 38.

In Figure 2 the spring is shown acting on a line above the pivot 37 to bias the seat-back rearwardly, and in Figure 1 (as also in Figure 5, presently to be described) the spring is acting on the other side of the pivot 37 resiliently to urge a stop 42 of the plate onto an abutment step 43 of the bracket 38 for sustaining the seat-back forwardly-tilted but with the line of action of the link 31 positioned to apply a reverse turning moment to the plate when an adequate rearward pressure is applied to the seat-back.

It will be seen that in the construction shown the spring 40 has the dual purpose, according as to which side of the pivot 37 its line of action passes, of biasing the seat-back to its normal rearward position or of holding it lightly biassed to a forwardly-tilted position.

The seat-back of Figures 3 to 5 is intended normally to be tilted hydraulically each time the drop-head passes into or out of the compartment 21, whereby to widen the mouth of the latter at that time. For this purpose there is a hydraulic cylinder 44 which is anchored in a central recess of the floor 20b and of which the coacting plunger rod 45 is to abut the back of the foundation 22, or a wear-resisting plate (not shown) fast therewith. The construction and operation of the cylinder 44 and plunger rod 45 forms no part of the present invention, but if the associated hydraulic system were to fail in operation the seat-back would have to be tilted manually to provide the desired widening of the mouth of the said compartment. Accordingly, and as a safeguard, the sustaining means described with reference to Figures 1 and 2 is provided for the purpose, but, as will presently be described, it is arranged that the sustaining means does not become automatically operative for holding the seat-back forwardly tilted while the hydraulic means is operating normally.

In Figure 3 the seat-back is shown in its normal position with the hydraulic plunger rod retracted, with the plate 36 and link 31 in fully folded condition, and with the spring 40 holding the foundation 22 onto the supporting structure 26. In Figure 4 the plunger rod is shown fully extended hydraulically, but with the sustaining means orientated for the line of pull of the spring 40 still on the side of the pivot 37 for urging the foundation 22 onto the plunger (i. e., the plate 36 has not turned on the pivot 37 sufficiently for the spring to overset the linkage for retaining the seat-back forwardly tilted). Thus, should the hydraulic system break down, the seat-back can be tilted further forwards (as indicated in Figure 5 by the space between the foundation and the fully extended plunger—shown in chain lines) for the sustaining means to become operative.

What I claim as my invention and desire to secure by Letter Patents of the United States is:

1. An automobile having a body, a seat-back hinged near the bottom to the body for forward tilting, a toggle at the back of the seat-back having one link hinged to the seat-back and the other to the body, abutment means including a stop on said other link cooperating with a fixed abutment for positively preventing the toggle from becoming fully straightened when the seat-back is tilted forwardly, and spring means connected to said other link and to a fixed part to bias said abutment means into the operative position when said seat-back is tilted forwardly, the spring being connected to the body link in a position such that movement of the seat-back from its forward to its rearward position causes the spring to pass through its dead-centre position whereby the initial thrust exerted in moving the seat from either position to the other position is opposed by the spring.

2. An automobile having a drop-head, a body providing a compartment into which at least the top of the drop-head can be retracted for stowing, a seat-back hinged near the bottom to the body and providing the front wall of said compartment, and means for sustaining the seat-back in a forwardly-tilted position until a sufficient rearward pressure is applied to it, said sustaining means comprising a foldable toggle interconnecting the seat-back and the body, a tension spring interconnecting a lateral portion of the body-connected toggle link and the body, said body-connected link arranged for said spring to pass to one side of the connection of said link to the body and for the thrust of the other toggle link to pass to the other side of said connection when in the sustaining position, and abutment means for limiting the angular movement of said body-connected link under the action of said spring when the seat-back is moved in the sustaining direction.

3. The combination with an automobile according to claim 1 of hydraulic means comprising a piston and cylinder, the piston adapted to abut the seat-back to move the seat into a forward position and to permit it to return to a rearward position under the action of the spring, which latter does not pass over its dead-centre position.

References Cited in the file of this patent
UNITED STATES PATENTS

| 1,990,848 | Velo | Feb. 12, 1935 |
| 2,599,277 | Orr | June 3, 1952 |

FOREIGN PATENTS

| 464,270 | Great Britain | Apr. 14, 1937 |